United States Patent [19]

Jacobson

[11] 4,119,801

[45] Oct. 10, 1978

[54] MODE SWITCHING AND VOLTAGE REGULATOR CIRCUITRY FOR A TELEPHONE ANSWERING DEVICE

[76] Inventor: Sava Jacobson, 8130 Orion St., Van Nuys, Calif. 91406

[21] Appl. No.: 641,551

[22] Filed: Dec. 17, 1975

[51] Int. Cl.² .............................................. H04M 1/65
[52] U.S. Cl. .................... 179/6 R; 318/332; 330/252; 330/259; 330/260
[58] Field of Search ................... 179/6 R, 6 C, 6 AC; 330/252, 259, 260; 328/206; 318/317, 332, 345, 139

[56] References Cited

U.S. PATENT DOCUMENTS

| | | | |
|---|---|---|---|
| 3,430,152 | 2/1969 | Walsh | 330/259 |
| 3,518,519 | 6/1970 | Callan | 318/332 |
| 3,564,444 | 2/1971 | Walsh | 330/252 |
| 3,586,779 | 6/1971 | Chernack | 179/6 R |
| 3,780,226 | 12/1973 | Jacobson | 179/6 R |
| 3,855,511 | 12/1974 | Smith | 318/317 |
| 3,909,537 | 9/1975 | Jacobson | 179/6 R |
| 3,935,390 | 1/1976 | Winterhulter | 179/6 R |
| 4,044,287 | 8/1977 | Ratzel | 318/332 |

*Primary Examiner*—Raymond F. Cardillo, Jr.
*Attorney, Agent, or Firm*—Spensley, Horn, Jubas & Lubitz

[57] ABSTRACT

In a telephone answering device, a bistable circuit employing a single operational amplifier is used for mode switching.

The bistable circuit uses feedback resistors from the operational amplifier output to respective inverting and non-inverting amplifier inputs. A capacitor is connected from a voltage terminal to one or the other input so as to force the amplifier output to an initial respectively high or low output state. If high, this state is maintained by selecting the feedback resistors to provide greater current into the non-inverting input. The low state is maintained by a voltage divider including the feedback resistor to the non-inverting input and another resistor to a voltage terminal that together keep the non-inverting input at below the threshold value. The circuit is switched by applying a triggering voltage to the appropriate input. In the answering device, the bistable circuit is used selectively to enable and disable the outgoing announcement and incoming message record amplifiers.

12 Claims, 6 Drawing Figures

MODE SWITCHING AND VOLTAGE REGULATOR CIRCUITRY FOR A TELEPHONE ANSWERING DEVICE

BACKGROUND OF THE INVENTION

1. Field of the Invention

The present invention relates to circuitry for a telephone answering device, and specifically to mode switching and voltage regulator circuitry employing operational amplifiers.

2. Description of the Prior Art

In a telephone answering device, the answering cycle is initiated upon detection of a ring signal on the telephone line. This conditions the device to transmit an announcement that is pre-recorded on a magnetic tape loop or other recording medium. At the completion of announcement transmission, the device is switched to the mode wherein the caller's message is recorded. The answering cycle then terminates, and the device is conditioned to answer the next call.

An object of the present invention is to provide an inexpensive telephone answering device that combines low cost with good performance and high reliability. This is obtained by utilizing operational amplifiers that are available as standard commercial integrated circuits to perform the voltage regulation, mode switching and audio amplification functions in the answering device.

For undistorted recording and playback of the announcement and the incoming messages, it is necessary that the recorder drive motor operate at a constant speed. The problem is particularly acute in a battery powered answering device wherein the battery voltage may decrease with time. Use of a regulator to provide constant voltage to the drive motor is imperative.

Prior art voltage regulators usually employ a Zener diode as a reference source against which the motor voltage is compared. An object of the present invention is to provide a voltage regulator that uses an operational amplifier exhibiting an input terminal abrupt threshold characteristic both as the voltage reference and as the driver for a series regulator transistor.

In the past, mode switching in a telephone answering device usually has employed relatively high cost relays or flip-flop circuitry. Another object of the present invention is to implement mode switching by means of a novel bistable circuit employing a single operational amplifier. When power is applied at the beginning of the answering cycle, the output signal from this bistable circuit is used to enable amplification of the outgoing announcement and to disable amplification of audio incoming from the telephone line. When announcement transmission is complete, the bistable circuit is switched to its second stable state in which the output signal now disables the outgoing amplifier and enables amplification of incoming messages.

Advantageously, the outgoing and incoming amplifiers both are implemented by operational amplifiers contained in a single commercially available integrated circuit chip that also contains the operational amplifiers used in the voltage regulator and in the bistable circuit. Low cost and circuit simplicity is achieved. Although described herein in conjunction with a telephone answering device, the bistable circuit and the voltage regulator each are novel circuits that may be used in other applications.

SUMMARY OF THE INVENTION

These and other objectives are achieved in a telephone answering device that utilizes for mode switching a bistable circuit having an single operational amplifier. Regulated power is supplied to the recorder drive motor by a voltage regulator that uses another operational amplifier as both the voltage reference and the control element.

The bistable circuit uses first and second feedback resistors connected from the operational amplifier output to respective inverting and non-inverting amplifier inputs. A capacitor is connected from the non-inverting input to the voltage return. With this arrangement, when power first is connected to the bistable circuit at the beginning of the answering cycle, the operational amplifier assumes a low output state. The second feedback resistor forms half of a voltage divider that maintains the positive (non-inverting) input to the operational amplifier at a voltage below threshold when the output signal is low. This maintains the bistable circuit in its first stable state in which the output is a low voltage.

At the end of outgoing announcement transmission, a positive voltage trigger is applied to the non-inverting input of the operational amplifier. This causes the output of the amplifier to rise to a high value. The feedback resistors are selected so that more feedback current flows to the positive input than to the negative (inverting) input. As a result, the operational amplifier is held in this second stable state in which a relatively high output voltage is provided.

Separate operational amplifiers are employed to amplify the outgoing announcement and incoming messages. When the bistable circuit is in its first state, the low output signal enables the outgoing announcement amplifier. This amplifier is biased to provide a dc output voltage upon which the outgoing announcement audio is superimposed. The dc component is used to bias off the other operational amplifier used to amplify incoming messages.

During message reception, the high output of the bistable circuit is used to bias off the outgoing announcement amplifier. As a result, the dc level at the output of this amplifier drops to a sufficiently low value so that the incoming amplifier no longer is disabled. Incoming messages are amplified and recorded.

The voltage regulator uses an operational amplifier of the type wherein the input terminal voltage exhibits a "square knee" characteristic. That is, when the input voltage is below a threshold value, herein referred to as a "turn-on voltage", the operational amplifier output remains unchanged. When the input voltage exceeds this threshold value, the output voltage is effected, going up if the input is to the positive or non-inverting input, and going down if the input is to the negative or inverting input. Once the threshold or turn-on voltage is reached, the input terminal voltage does not increase even though additional current is injected into the input. Thus, a curve of input terminal voltage as a function of injection current will exhibit a "square knee" or rectangular shape. This characteristic is exhibited by operational amplifiers such as contained in the integrated circuit type LM 3900 sold commercially by National Semiconductor, Corp.

In the voltage regulator disclosed herein, the operational amplifier is used to drive a transistor connected as a series regulator between the voltage source and the load. The divider ratio is selected so that when the desired output voltage is obtained, the voltage at the divider junction will equal the threshold voltage of the operational amplifier. This junction is connected to the appropriate operational amplifier input so as to provide a phase reversal (i.e., negative feedback). As a result, an increase or decrease in the output voltage will cause the operational amplifier respectively to decrease or increase conduction of the series regulator transistor, thereby correcting the output voltage to the desired, regulated value.

BRIEF DESCRIPTION OF THE DRAWINGS

A detailed description of the invention will be made with reference to the accompanying drawings wherein like numerals designate corresponding elements in the several figures.

FIG. 2 is an electrical schematic diagram of the amplification and mode control circuitry used in the inventive telephone answering device.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
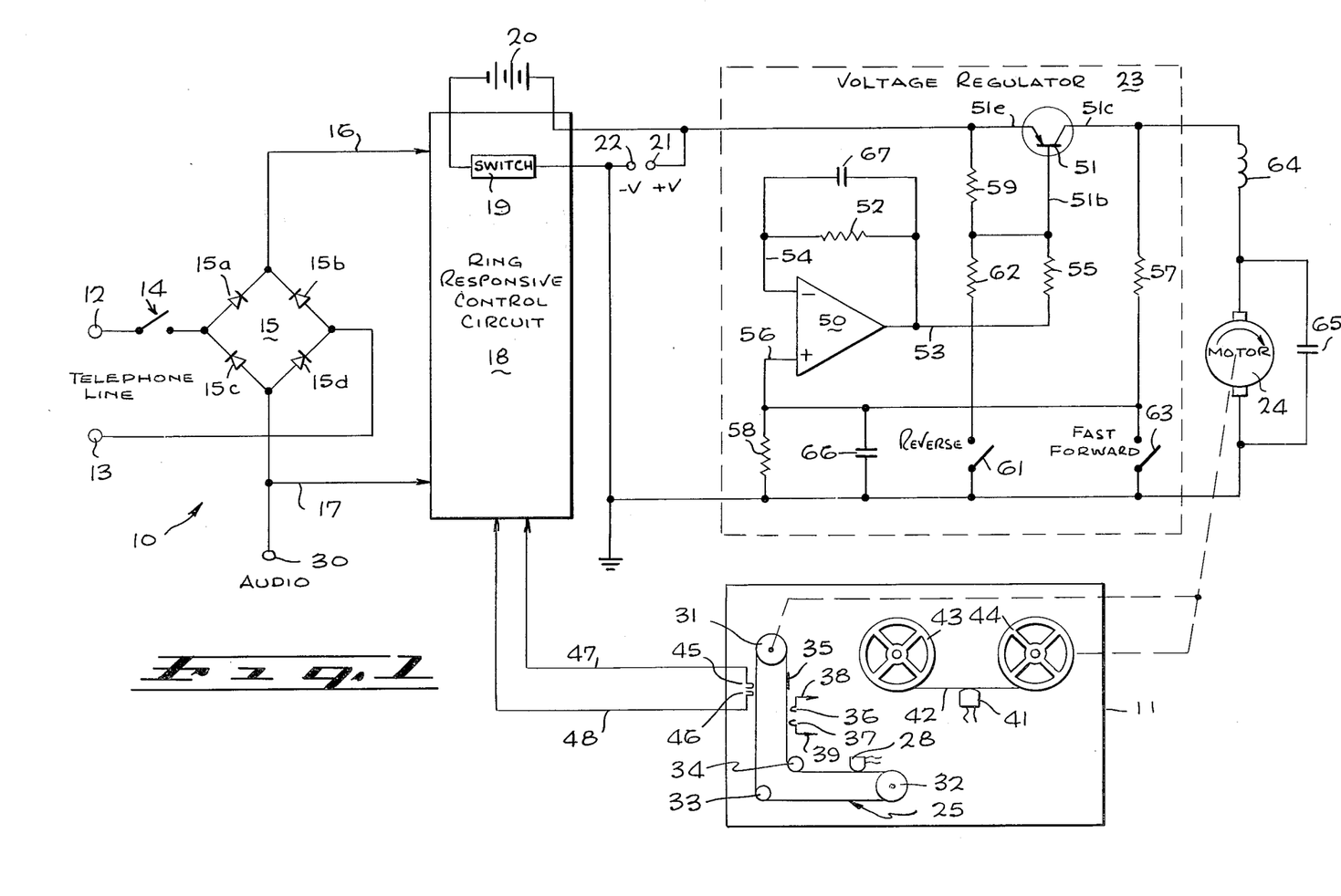
FIG. 1 is a diagrammatic view, partly pictorial and partly schematic, of the inventive telephone answering device and of the voltage regulator circuit employed therein.

Referring to FIG. 1, the telephone answering device 10 is contained in a housing 11 and is connected to a telephone line via a pair of terminals 12, 13. The device 10 is turned on by closing a switch 14 which connects the telephone line to a rectifier bridge 15 consisting of four diodes 15a–15d. Use of the bridge 15 enables the device 10 to be connected to the telephone line without regard to polarity.

The bridge 15 output is connected via lines 16 and 17 to a ring responsive control circuit 18. When a ringing signal occurs on the telephone line, the control circuit 18 closes a switch 19 that connects voltage from a battery 20 to a pair of terminals 21, 22. Connected to these terminals are a voltage regulator 23 that supplies power to a motor 24, and to the amplification and mode control circuitry of FIG. 2. The control circuit 18 also latches the telephone line.

With this arrangement, when an incoming call is indicated by detection of the ring signal, closure of the switch 19 causes the motor 24 to drive an endless tape loop 25 that contains the outgoing announcement. This announcement is picked up by a playback/record head 28, amplified by the circuitry of FIG. 2, and supplied to the telephone line via the audio terminal 30 connected to the bridge 15. Typically the announcement will inform the caller that the recipient is not in, and that the caller should leave a message subsequent to hearing a beep tone.

In the embodiment shown, the announcement tape loop 25 extends between a pair of pulleys 31, 32 at least one of which is driven by the motor 24. The loop 25 also extends around a pair of idler wheels 33, 34.

The tape loop 25 also is used to control timing of the outgoing announcement and incoming message portions of the answering cycle. To this end, a metallic strip 35 is affixed to the tape loop 25. At the end of the outgoing announcement, the strip 35 reaches and shorts together a pair of electrical contacts 36, 37 that are connected via electrical leads 38, 39 to the circuitry of FIG. 2. As described below, shorting of the terminals 36, 37 causes the answering device to switch from the outgoing announcement to the incoming message record mode. At the time the strip 35 shorts the terminals 36, 37 a previously recorded beep tone also is transmitted to the caller.

The incoming message is recorded via a record/playback head 41 onto a tape 42 supplied from a reel 43. The tape 42 is received by a tape-up reel 44 that may be rim-driven from the motor 24. Alternatively, the motor 24 may provide a capstan drive for the tape 42.

As the incoming message is recorded on the tape 42, the tape loop 25 continues to be driven by the motor 24. When the metallic strip 35 reaches and shorts together a second set of electrical contacts 45, 46 the answering cycle is terminated. To this end, the contacts 45, 46 are connected via lines 47, 48 to the control circuit 18. In this circuit, shorting of the terminals 45, 46 causes the switch 19 to be opened, thereby disconnecting power to the terminals 21, 22 and thereby turning off the motor 24 and removing power from the circuitry of FIG. 2.

The ring responsive control circuit 18 advantageously, but not necessarily, may correspond to the CONTROL CIRCUIT FOR TELEPHONE ANSWERING DEVICE shown in the inventor's U.S. Pat. Nos. 3,818,141 and 3,909,538. Alternatively, the control circuit may correspond to that shown in the inventor's U.S. Pat. No. 3,780,226 entitled TELEPHONE ANSWERING APPARATUS. Use of the tape loop 25 and metallic strip 35 to time portions of the answering cycle is not required for the present invention. Other techniques may be used, such as the timing mechanism and ring responsive control circuitry shown in the inventor's U.S. Pat. No. 3,909,537.

Use of the regulator 23 insures that a constant voltage will be supplied to the motor 24 regardless of decrease in the voltage supplied from the battery 20. Such constant motor 24 speed is required to insure undistorted playback of both the outgoing announcement and the recorded incoming messages, even though the battery 20 may be weak and in need of replacement or recharging.

The voltage regulator 23 utilizes an operational amplifier 50 of the type that exhibits a Zener-diode type characteristic at at least one of its input terminals. For example, the amplifier 50 may comprise one section of a type LM 3900 integrated circuit sold commercially by National Semiconductor Corp. As noted, in such an operational amplifier, an input threshold or "turn-on" voltage must be reached before the output is effected. If additional injection current is supplied to the input terminal, the terminal voltage will remain at the same value. In the case of the type LM 3900 operational amplifier, each input terminal exhibits such characteristic, with a threshold of approximately 0.55 volts.

In the regulator 23, the operational amplifier 50 controls a transistor 51 that series regulates the voltage supplied from the terminal 21 to the motor 24. Negative feedback is provided by a resistor 52 connected from the amplifier output terminal 53 to the negative (−) input 54. A resistor 55 connects the amplifier output 53 to the base of the transistor 51.

To obtain voltage regulation, the collector or output terminal 51c of the transistor 51 is connected to the amplifier 50 non-inverting (+) input terminal 56 via a resistor 57. The terminal 56 also is connected to the negative voltage terminal 22 via a resistor 58. Thus, the resistors 57 and 58 together form a voltage divider connected across the regulated voltage supplied to the motor 24. The values of the resistors 57 and 58 are selected so that when the desired voltage is supplied to the motor 24, the voltage at the junction of the resistors 57 and 58 will correspond to the threshold voltage at the amplifier terminal 56 to which this junction is connected.

With this arrangement, if the voltage supplied to the motor 24 is too low, the voltage at the junction of the resistors 57, 58 will be below the threshold value. Negative feedback via the resistor 52 will cause the amplifier output terminal 53 to assume a low voltage approximately equal to the threshold value of the negative input terminal. This will cause increased conduction of the transistor 51, thereby providing a higher voltage to the motor 24.

If the voltage supplied by the transistor 51 rises above the desired voltage for the motor 24, the voltage at the junction of the resistors 57, 58 will rise above the threshold or "turn-on" voltage of the non-inverting (+) input terminal 56. As a result, the amplifier 50 output voltage at the terminal 53 will go to a relatively high positive value so that the voltage at the transistor base 51b also will go more positive. This will reduce conduction of the transistor 51, thereby lowering the voltage supplied to the motor 24. The regulator circuit 23 thus operates to maintain the voltage supplied to the motor 24 at a constant value.

During rewind of the tape 41, it is desirable to run the motor 24 at maximum speed. Accordingly, when the drive train from the motor 24 is mechanically shifted to rewind the tape 42 onto the supply reel 43, a reverse switch 61 is closed. This connects a resistor 62 from the voltage return to the base 51b thereby supplying sufficient base current to maintain the transistor 51 in full conduction. Substantially the entire voltage of the battery 20 is supplied to the motor 24 which then runs at maximum speed. Similarly, during fast forward operation a switch 63 is closed. This grounds the positive input terminal 56 so that the amplifier 50 output is only determined by the feedback resistor 52. High conduction of the transistor 51 results, with maximum, unregulated voltage being supplied to the motor 24.

As inductor 64 and a capacitor 65 provide arc suppression for the motor 24. However, some residual arcing may occur in the motor 24 that could produce noise pulses. Should such pulses leak back into the amplifier 50 they could cause undesirable noise in those amplifiers, used in the circuitry of FIG. 2, that are contained on the same integrated circuit chip as the amplifier 50.

To prevent such noise injection, a pair of capacitors 66, 67 are included in the regulator 23 circuit. One noise path from the motor 24 is via the resistor 57 to the amplifier input terminal 56. Noise pulses on this path are bypassed to ground by the capacitor 66. A second path is from the motor 24 via the collector to base junction of the transistor 51 and the resistor 55 to the amplifier output terminal 53. The effect of such noise pulses is cancelled by negative feedback provided by the capacitor 67 connected from the output terminal 53 to the negative input terminal 54.

Referring now to the circuitry of FIG. 2, mode switching in the telephone answering device 10 is accomplished by a bistable circuit 70 which utilizes an operational amplifier 71. When the switch 19 (FIG. 1) is closed to apply voltage to the terminals 21, 22 at the beginning of the telephone answering cycle, the circuit 70 assumes a first stable state which enables amplification of the outgoing announcement. When the contacts 36, 37 are shorted at the end of the announcement, the circuit 70 is switched to its second stable state in which amplification from the outgoing announcement head 28 is disabled, and amplification of the incoming message for recording by the head 41 is enabled.

In the bistable circuit 70 a capacitor 72 is connected from the positive amplifier input terminal 73 to ground. Before the switch 19 is closed, the capacitor 72 is discharged. Therefore when voltage is turned on at the beginning of the answering cycle, the uncharged capacitor 72 maintains the positive input terminal 73 at ground potential. A negative feedback resistor 74 thus holds the amplifier 71 output terminal 75 at a very low potential established by the threshold voltage of the negative input terminal 76. A pair of resistors 77, 78 form a voltage divider between the output terminal 75 and ground, with the junction of these resistors being connected to the positive input terminal 73. Since the voltage at the output terminal 75 is near ground, the divided voltage at the terminal 73 is below the turn-on or threshold level for that terminal. As a result, the amplifier 71 remains in this first stable state wherein the voltage at the terminal 75 is low. A correspondingly low control signal is obtained on a line 79 that is connected via a resistor 80 to the terminal 75. Amplification of the outgoing announcement is enabled when the control signal on the line 79 is low.

The circuit 70 remains in this first stable state until the end of the outgoing announcement when the contacts 36, 37 are shorted. When this occurs, a positive dc voltage is applied to the terminal 73 from the output 93 of an amplifier 87 (described below) via a resistor 83, the shorted contacts 36, 37 and a diode 84. This voltage, applied to the (+) terminal 73, is above the turn-on voltage for that terinal, and hence is sufficient to cause the output of the amplifier 71 to rise toward the full voltage of the battery 20. The values of the resistors 74 and 77 are selected so that more current will flow through the resistor 77 than through the resistor 74. Thus when the voltage at the terminal 75 gets sufficient high, the greater current through the resistor 77 will maintain the positive input terminal 73 at the turn-on value. That is, the amplifier 71 will stabilize with the voltage 75 at a high value. In this second stable state, a high output voltage is produced on the line 79. After a time delay established by the charging of a capacitor 85 via the resistor 80, the high output voltage disables amplification of the outgoing announcement and enables amplification of the incoming message.

The values of the resistor 80 and the capacitor 85 are selected so that switchover of the bistable circuit 70 does not occur instantaneously when the contacts 36, 37 are shorted. Rather, this RC delay time is selected to be long enough to permit transmission of a beep tone recorded on the tape loop 25 during the time the contacts 36, 37 are shorted and before switchover to the incoming message record mode. Alternatively, the capacitor 85 may be eliminated, in which instance the circuit 70 will switch to its second stable state as soon as the contacts 36, 37 are shorted. In either case, the circuit 70 remains in this second state until the end of the answering cycle, when power is removed as a result of opening the switch 19. In other applications, the bistable circuits 70 may be switched back to its first state by momentarily grounding the positive input terminal 73.

The outgoing announcement from the head 28 is supplied to the telephone line via a preamplifier stage utilizing an operational amplifier 87 and another amplifier stage using a transistor 88 the output of which is connected via a capacitor 89 to the audio terminal 30. A load resistor 90 is connected to the collector of the transistor 88, a current limiting resistor 91 is connected to the emitter, and base bias is obtained via a resistor 92. Signal input from the amplifier 87 output terminal 93 is via a capacitor 94 connected to a base of the transistor 88.

Audio from the announcement head 28 is supplied to the negative input 95 of the amplifier 87 via a capacitor 96 and a resistor 97. A bypass capacitor 98 is connected across the head 28. To maintain the amplifier output terminal 93 at about the center of the audio swing, and thereby achieve minimum distortion of the outgoing announcement, an appropriate current is supplied to the positive amplifier input terminal 99 via a resistor 100 connected between that terminal and the +v source 21. Negative feedback is provided by a resistor 101, and the gain of the amplifier 87 is set by the ratio of the resistors 101 and 97. The output signal from the bistable circuit 70 is connected via the line 79 and a diode 102 to the junction between the capacitor 96 and the resistor 97.

During outgoing announcement transmission, the bistable circuit 70 produces a low voltage on the line 79 which does not inhibit or interfere with the operation of the amplifier 87 just described, since this voltage is below the threshold of silicon diode 102. Thus during announcement transmission, the amplifier output terminal 93 contains an audio signal superimposed on a dc bias which is set by the resistor 100 to the center of the audio swing. This dc bias serves a second function, namely to inhibit the incoming amplifier 103 during announcement transmission. To this end, the dc bias from the terminal 93 is supplied via a diode 104 and a resistor 105 to the negative input terminal 106 of the amplifier 103. The current thus supplied to the terminal 106 is sufficient to drive the amplifier 103 output to a very low level. Thus no incoming signals reach the incoming message head 41 during transmission of the outgoing announcement.

When the bistable circuit 70 switches to its second stable state, a high positive voltage is present on the line 79. This is fed via the diode 102 and the resistor 97 to the negative input 95, thereby causing turnoff of the amplifier 87. That is, the dc signal thus supplied to the input terminal 95 forces the voltage at the amplifier output 93 to remain at a dc level near ground. No audio appears at this output, since the positive voltage supplied via the diode 102 is greater in magnitude than any audio which might be supplied via the capacitor 96. Thus the outgoing amplifier 87 is disabled.

The low voltage at the amplifier output terminal 93 is insufficient to disable the amplifier 103, since it is less than the threshold of the silicon diode 104. Thus incoming audio from the telephone line, supplied from the terminal 30 via a capacitor 108, a resistor 109 and the resistor 105 to the input terminal 106, is amplified by the amplifier 103 and supplied via a resistor 110 to the incoming message record head 41. Amplification and recording of the incoming message thus is enabled. For minimum distortion, sufficient current is supplied to the positive input terminal 111 via a resistor 112 so as to bias the amplifier output terminal 113 to a voltage at the center of the audio swing. This dc voltage at the terminal 113 also serves as dc bias for the record head 41. The gain of the amplifier 103 is set by a negative feedback resistor 114 in conjunction with the input resistors 105 and 109.

Advantageously, but not necessarily, the amplifiers 71, 87, 103 and 50 may comprise the four separate sections of a single type LM 3900 integrated circuit such as that manufactured by National Semiconductor, Inc. In this case, only a single set of power lines are connected to the integrated circuit quad amplifier chip. These are indicated diagramatically by the positive and negative voltage leads 116, 117 that are shown connected to the amplifier 103 in FIG. 2. Of course, if separate IC chips or circuits are used for the amplifiers 50, 71, 87 and 103, then appropriate individual power lines would be provided to these circuits from the terminals 21 and 22.

Figure 3:
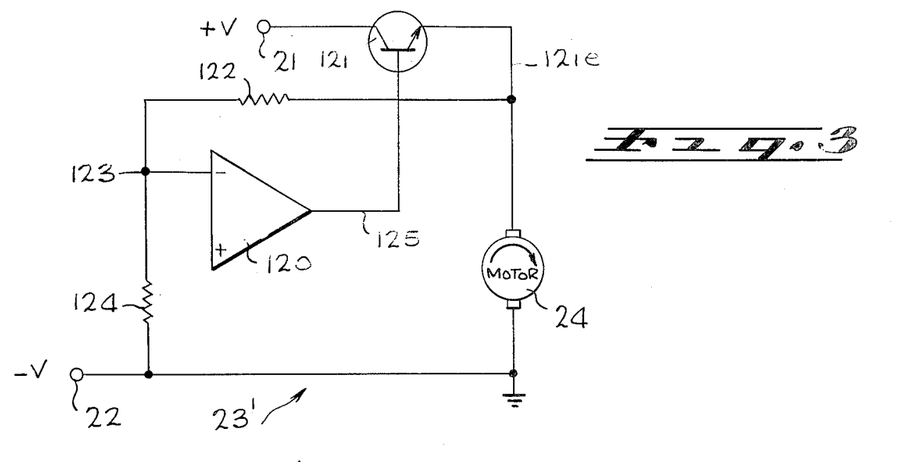
FIG. 3 is an electrical schematic diagram of an alternative voltage regulator circuit.

An alternative voltage regulator 23′ is shown in FIG. 3. An operational amplifier 120 drives an NPN transistor 121 that series regulates the voltage to the motor 24. The emitter 121e of this transistor is connected via a feedback resistor 122 to the negative input terminal 123 of the amplifier 120. The terminal 123 also is connected to the −v terminal 22 via a resistor 124. The resistors 122 and 124 form a voltage divider such that when the voltage to the motor 24 is of the desired value (for example, 2.8 volts), then the voltage at the negatitve terminal 123 will be equal to the turn-on voltage or threshold level (typically 0.5 volts for a type LM 3900 amplifier) for this terminal.

The amplifier 120 output terminal 125 is connected to the base of the transistor 121. With this arrangement, there is no phase reversal between the output terminal 125 and the voltage supplied to the motor 24 via the emitter 121e. However, the feedback resistor 122 is connected to the negative or inversion input of the amplifier 120. Thus, when the voltage to the motor 24 drops below the desired value, the terminal 123 will drop below the turn-on potential and the output 125 will increase in voltage toward the +v value of the battery 20. As a result, conduction of the transistor 121 will increase to provide the requisite voltage to the motor 24.

Figure 4:
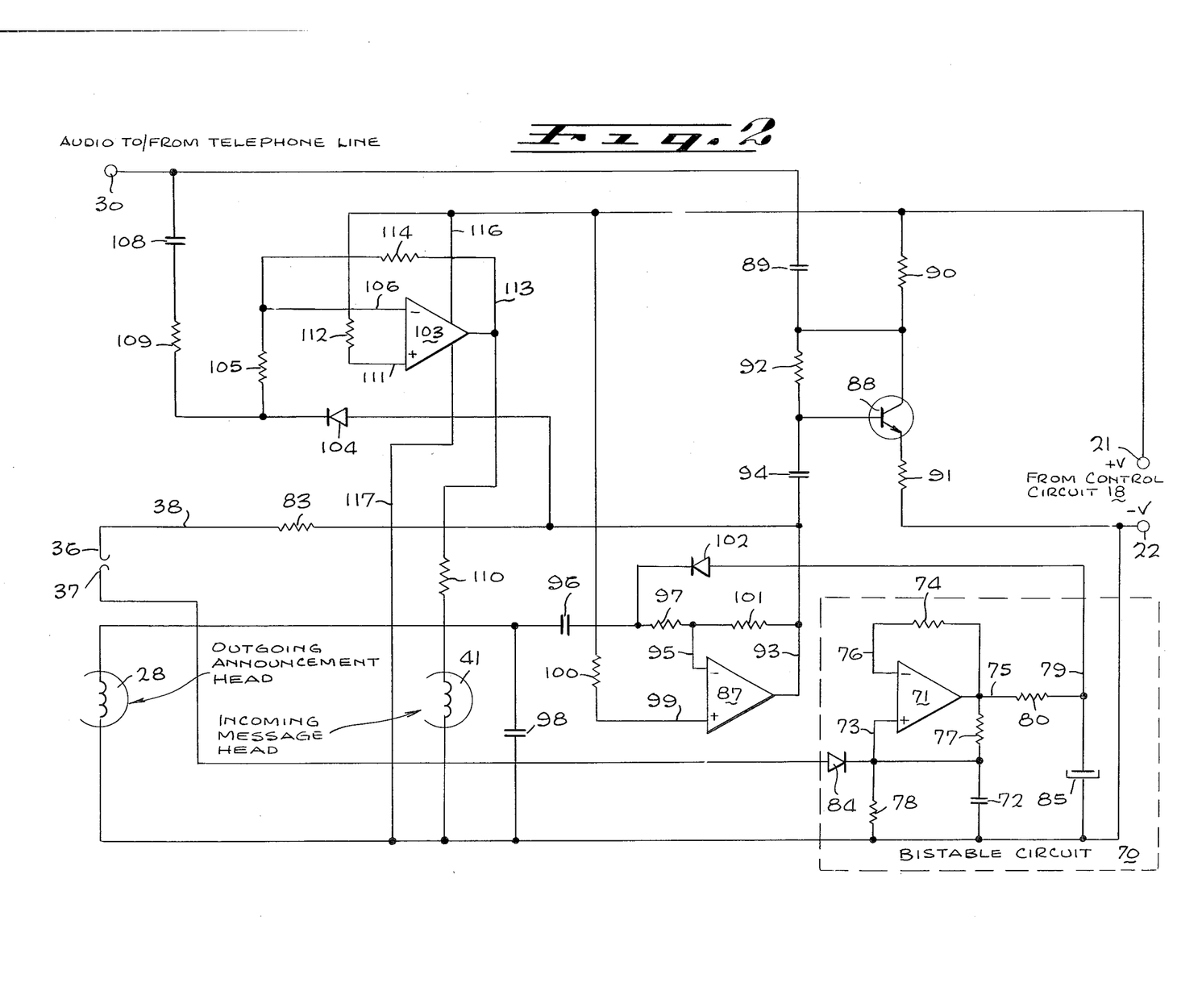
FIG. 4 is an electrical schematic diagram of a modified bistable circuit useful with the answering device of FIGS. 1 and 2.

An alternative version of the bistable circuit 70 is shown in FIG. 4. There, the circuit 70′ uses an operational amplifier 71′ together with resistors 74′, 77′ and 78′ connected like the circuit 70. However, a capacitor 72a now connects the negative amplifier terminal 76′ to the +v terminal 21.

When power first is turned on, as in response to a telephone ring signal, a charging current is supplied to the capacitor 72a. This current is injected into the negative input terminal 76′, and thus causes the amplifier output terminal 75′ to go low. The resistors 77′ and 78′ serve as a voltage divider that maintains the positive input terminal 73′ below the turn-on potential of that terminal. As a result, the output terminal 75' remains at a low potential, representing the first stable state of the circuit 70'.

The circuit 70' may be switched to the second stable state by applying a positive voltage to the positive input terminal 73'. This is done by momentarily closing a switch 127 to connect the +v terminal 21 via a diode 84' to the terminal 73'. The output 75' will go to a high voltage indicative of the second stable state. The greater current through the resistor 77' as compared with the current through the resistor 74' will maintain the amplifier 71' in this high output condition. Closure of the switch 127 corresponds to shorting of the contacts 36, 37 by the metallic strip 35.

Figure 5:
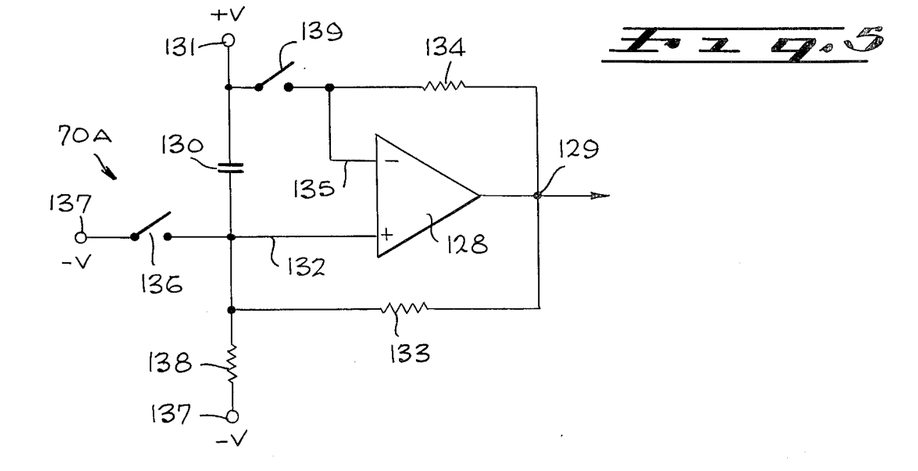
FIG. 5 is an electrical schematic diagram of an alternative bistable circuit employing a single operational amplifier.

Another bistable circuit 70A is shown in FIG. 5. When power first is applied to this circuit 70A, the amplifier 128 will provide a high output at the terminal 129. This occurs since a capacitor 130 provides a positive trigger voltage from the +v terminal 131 to the positive input 132 of the amplifier 128. The positive feedback resistor 133 has a lower value than the negative feedback resistor 134, so that more current is injected to the positive input 132 than into the negative input 135. This maintains a high output from the amplifier 128.

The circuit 70A may be flipped to its second stable state, in which the output 129 is at a low potential, by momentary closure of a switch 136 that connects a negative voltage from a −v terminal 137 to the positive input 132. This causes the output 129 to drop to a low voltage. A voltage divider comprising the resistor 133 and another transistor 138 connected from the terminal 132 to the −v terminal 137 maintains the input 132 at a low value, even after the switch 136 is opened. Thus, the amplifier 128 continues to produce a low output. Alternatively, the circuit 70A can be switched can be switched from the high to the low output state by momentary closure of a switch 139 that connects the negative input 135 to the +v terminal 131. Application of the high +v voltage to this negative input terminal 135 causes the amplifier 128 to produce a low output.

Figure 6:
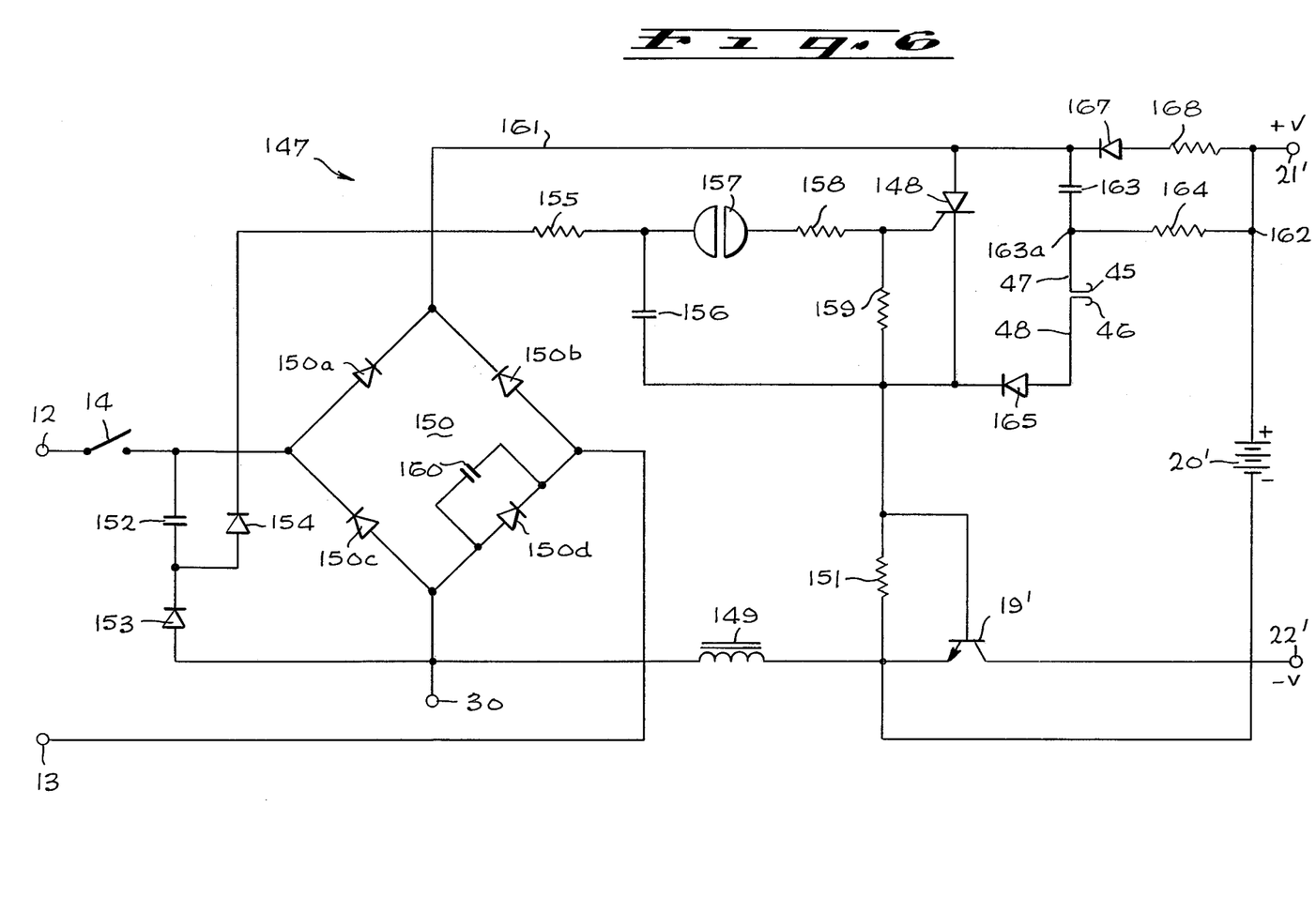
FIG. 6 is an electrical schematic diagram of a ring responsive control circuit that could be used with the inventive telephone answering device.

The ring responsive control circuit 147 shown in FIG. 6 is an improvement over the circuit shown in the inventor's U.S. Pat. No. 3,909,537. It is designed to prevent unintentional actuation of the telephone answering device in response to a high dc test voltage on the telephone line.

In testing a telephone line for leakage, it is not uncommon for the telephone company to apply a 200 volt dc signal across the line. If the line exhibits a resistance of 20 megohms or less, corresponding to a current of 10 microamperes or more, the line is adjudged faulty. It is desirable to have the ring responsive control circuit in the telephone answering device be configured so that it will not respond to the 200 volt dc test voltage, but will only be actuated in response to an ac ring voltage. This is accomplished by the circuit 147 of FIG. 6.

In that circuit, voltage from the battery 20' is applied to the terminals 21', 22' via a transistor 19' that functions as the switch 19. The transistor 19' itself is turned on by a silicon controlled rectifier 148 that is triggered on in response to a ring signal. The SCR 148 is connected in series with the base-to-emitter path of the transistor 19' and an inductor 149 across the output terminals of a rectifier bridge 150. A resistor 151 biases the transistor 19' off until the SCR 148 is triggered. When the transistor 19' is turned on, the inductor 149 effectively is connected across the telephone line to simulate the off-hook condition.

To trigger the SCR 148, the ac ring voltage is applied to a half wave voltage doubler circuit consisting of a capacitor 152 and a pair of diodes 153 and 154. The rectified ring voltage is applied via a filter resistor 155 to a capacitor 156. When the charge across the capacitor 156 reaches a level sufficient to fire a neon bulb 157, the resultant discharge current through a pair of resistors 158, 159 triggers the SCR 148 into conduction. This turns on the transistor 19', thereby connecting the battery 20' to the terminals 21', 22' and thereby starting the answering cycle.

In accordance with the present invention, a dc voltage on the telephone line will not trigger the SCR 148. This is so since there is no dc path from the telephone terminals 12, 13 to the capacitor 152 in the voltage doubler. Specifically, the diode 150d in the bridge 150 is connected back-to-back in series with the diode 153 and the capacitor 152 across the telephone line. However, a capacitor 160 is connected across the diode 150d to provide an ac path to the voltage doubler. By using this capacitor 160, the ac ring voltage is able to charge the capacitor 152 via the diode 153, thereby causing the voltage doubler to apply the rectified ring voltage to the trigger capacitor 156. Actuation of the switch 19' thus is accomplished only in response to an ac ring signal, and not in response to even a high dc voltage that may be applied to the telephone line as a test signal.

During the answering cycle, when the SCR 148 is conducting, there is a potential difference between the bridge 150 output terminal 161 and the positive terminal 162 of the battery 20'. As a result, a capacitor 163 is charged via a resistor 164. The polarity at the capacitor terminal 163a will be positive with respect to the line 161. Thus when the conductive strip 35 shorts out the terminals 45, 46, the capacitor 163 will discharge (via a diode 165) across the SCR 148. This discharge is of the correct polarity to cause the SCR 148 to turn off.

It is possible that during the answering cycle the dc bias on the telephone line may be interrupted, causing premature turn off of the SCR 148. This is prevented by a diode 167 and a resistor 168 connected between the line 161 and the positive terminal 162 of the battery 20'. The value of the resistor 168 is selected to provide sufficient current to hold the SCR 148 in the conducting state should bias on the telephone line be interrupted.

Intending to claim all novel, useful and unobvious features shown or described, we make the following:

I claim:

1. A telephone answering device of the type having a voltage source and a ring responsive control circuit means for switching on said voltage source in response to a ring signal on a telephone line, said device further having a bistable circuit comprising:

a first operational amplifier having an inverting input, a non-inverting input and an output, first and second feedback resistors connected from said amplifier output respectively to said inverting and non-inverting inputs, a third resistor connected from said amplifier non-inverting input to a voltage return, said second and third resistors together forming a voltage divider that keeps said non-inverting input below the turn-on threshold thereof when the output of said amplifier is low, thereby maintaining said circuit in a first stable state in which said amplifier output is low, said first resistor being of greater resistance than said second resistor so that when the output of said amplifier is high, the current flow through said second resistor to said non-inverting input is sufficiently greater than the current flow through said first resistor to said inverting input so as to maintain said circuit in a second stable state in which said amplifier output is high, first means for setting said circuit to one of said two stable states, and switching means for thereafter setting said circuit to the other of said two stable states, and wherein said bistable circuit is connected to control the operational mode of said answering device.

2. A telephone answering device according to claim 1 wherein an outgoing announcement is transmitted to said telephone line via first amplifier means and subsequently an incoming message is recorded via second amplifier means, wherein said operational amplifier output is connected so that when in said one stable state said bistable circuit enables said first amplifier means and disables said second amplifier means, and when in said other state said bistable circuit disables said first amplifier means and enables said second amplifier means.

3. A telephone answering device according to claim 1 wherein said first means comprises a capacitor connected from a voltage source to one of said inputs, the polarity of said voltage source being selected so that said amplifier output is set low and said bistable circuit is set to one state when said voltage source is turned on, and wherein said switching means provides to said non-inverting input a potential sufficiently above said turn-on threshold so as to cause said amplifier to produce a high output and hence cause said bistable circuit to switch to the other stable state.

4. A telephone answering device according to claim 2, said bistable circuit assuming said low output state upon ring detection, said answering device further including:

a second operational amplifier connected to amplify an outgoing announcement for transmission to said telephone line, disable means connecting the output of said first operational amplifier to an input of said second operational amplifier so as to disable amplification thereby when said bistable circuit output is high, and wherein said switching means switches said bistable circuit to said high output state at the end of outgoing announcement transmission, whereby said second operational amplifier is disabled during incoming message reception subsequent to transmission of said outgoing message.

5. A telephone answering device according to claim 4 wherein said second operational amplifier is biased to produce a dc output with said outgoing announcement superimposed thereon when not disabled, said answering device further including:

a third operational amplifier connected to amplify messages incoming from said telephone line, the output of said second operational amplifier being connected to an input to said third operational amplifier so that said dc output will disable operation thereof during announcement transmission.

6. A telephone answering device according to claim 5 wherein said first operational amplifier output is connected to the inverting input of said second operational amplifier so as to force the output thereof to a low value during incoming message reception when said bistable circuit is in said high output state, and wherein said second operational amplifier output is connected via a diode to the inverting input of said third operational amplifier so as to force the output thereof to a low value during announcement transmission when said bistable circuit is in said low output state and said second operational amplifier produces said dc output on which said announcement is superimposed.

7. A telephone answering device according to claim 6 wherein said announcement is recorded on a tape loop, wherein said second operational amplifier amplifies the output of a playback head associated with said tape loop, wherein said tape loop includes a metallic strip used for cycle timing, and wherein said metallic strip shorts a set of contacts at the end of announcement transmission, said potential being provided to said first operational amplifier non-inverting input via said contacts so that shorting of said contacts causes said bistable circuit to switch to said other, high output state.

8. A telephone answering device having a ring responsive control circuit means for switching on power upon detection of a ring signal on a telephone line, wherein a recorded outgoing announcement is transmitted to said telephone line during an initial portion of the answering cycle, and wherein an incoming message is recorded during a subsequent portion of the answering cycle, the improvement comprising:

a bistable circuit connected to assume one stable state when said power is switched on and to assume a second stable state at the completion of outgoing announcement transmission, a first operational amplifier connected to amplify said announcement during transmission thereof, said amplifier being biased to provide a dc output about which the announcement audio is superimposed, first means connecting said bistable circuit to an input terminal of said first operational amplifier so as to force the output thereof to a constant value inhibiting audio transmission therethrough when said bistable circuit is in said second stable state.

9. A telephone answering device according to claim 8 further comprising:

a second operational amplifier connected to amplify said incoming message during reception thereof, and second means connecting the dc output of said first operational amplifier to an input of said second operational amplifier so that said dc output will force the output of said second operational amplifier to a constant value inhibiting audio amplification therethrough during transmission of said outgoing announcement.

10. A telephone answering device according to claim 9 wherein said bistable circuit produces a low output on a line when in said first stable state and a high output on said same line when in said second stable state, wherein a bias is supplied to the non-inverting input of said first operational amplifier to produce said dc output therefrom, wherein said recorded announcement is provided from a pickup head to the inverting input of said first operational amplifier, and wherein said bistable circuit output line also is connected to said first operational amplifier inverting input so that occurrence of the high signal on said line will cause the output of said first operational amplifier to remain fixed at a minimum value.

11. A telephone answering device according to claim 9 wherein said bistable circuit comprises:
   another operational amplifier having an inverting input, a non-inverting input and an output,
   first and second feedback resistors connected from said amplifier output respectively to said inverting and non-inverting inputs,
   a third resistor connected from said amplifier non-inverting input to a voltage return, said second and third resistors together forming a voltage divider that keeps said non-inverting input below the turn-on threshold thereof when the output of said amplifier is low, thereby maintaining said circuit in a first stable state in which said amplifier output is low, said first resistor being of greater resistance than said second resistor so that when the output of said amplifier is high, the current flow through said second resistor to said non-inverting input is sufficiently greater than the current flow through said first resistor to said inverting input so as to maintain said circuit in a second stable state in which said amplifier output is high,
   first means for setting said circuit to one of said two stable states when said power is switched on by said ring responsive control circuit, and
   switching means for setting said circuit to the second of said two stable states upon completion of transmission of said announcement.

12. A telephone answering device according to claim 8 including recording means for providing said outgoing announcement and for recording incoming messages, said recording means being driven by at least one motor, said answering device further including a voltage regulator comprising:
   a further operational amplifier having an input terminal exhibiting an abrupt threshold voltage, the input terminal voltage remaining at said threshold value regardless of increase in the injection current to said input terminal once said threshold value has been reached,
   a transistor connected in series between the power source switched on by said ring responsive control circuit and said motor,
   a voltage divider comprising a pair of resistors connected in series across the regulated voltage supplied to said motor via said transistor, the junction of said resistors being connected to said further operational amplifier input terminal to provide a phase reversal between that input terminal and the output from said transistor to said motor, said divider being selected so that when the desired regulated motor voltage is supplied by said transistor to said motor the voltage provided from said divider junction to said input terminal is equal to said threshold value.

* * * * *